(12) United States Patent
Quiring

(10) Patent No.: US 7,954,839 B2
(45) Date of Patent: Jun. 7, 2011

(54) TEMPORARY SINGLE ARM ADJUSTABLE GOOSE NECK HITCH SYSTEM

(76) Inventor: Richard L. Quiring, Stony Plain (CA)

( * ) Notice: Subject to any disclaimer, the term of this patent is extended or adjusted under 35 U.S.C. 154(b) by 0 days.

(21) Appl. No.: 12/586,274

(22) Filed: Sep. 21, 2009

(65) Prior Publication Data

US 2010/0084837 A1    Apr. 8, 2010

(51) Int. Cl.
*B62D 1/42*    (2006.01)
(52) U.S. Cl. .................................. 280/441.2
(58) Field of Classification Search ........... 280/441.2, 280/417.1, 416.1
See application file for complete search history.

(56) References Cited

U.S. PATENT DOCUMENTS

| 3,796,443 | A  | * | 3/1974  | Crutchfield | 280/406.2 |
| 4,832,358 | A  | * | 5/1989  | Bull | 280/418.1 |
| 6,234,509 | B1 | * | 5/2001  | Lara | 280/425.2 |
| 6,474,673 | B1 | * | 11/2002 | Biggins | 280/417.1 |
| 7,654,551 | B2 | * | 2/2010  | Page | 280/416.1 |
| 2003/0184046 | A1 | * | 10/2003 | Bourgault et al. | 280/417.1 |

* cited by examiner

*Primary Examiner* — Tony H. Winner

(57) ABSTRACT

An attachment having an interchangeable means for converting a traditionally manufactured tow behind, A frame or straight tongue trailer into a functioning single arm goose neck style trailer. This hitch systems forward end can be temporarily attached to, and towed by a variety of independent self propelled utility vehicles, that are equipped with a 5$^{th}$ wheel coupling device. The rearward end of this hitch system temporarily attaches to the most forward end of a trailer frame hitch tongue, with the use of a quick change coupler device, and is secured within the coupler by using a temporary fastener.

4 Claims, 4 Drawing Sheets

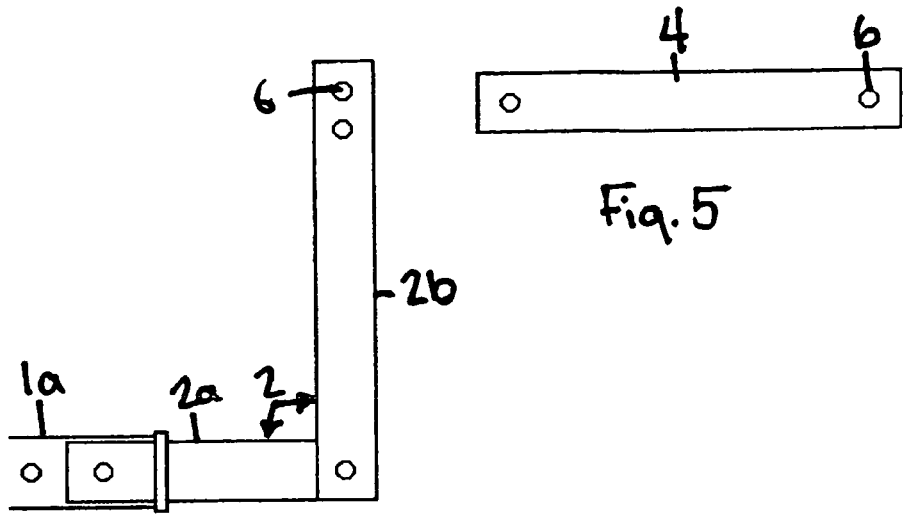
Fig. 4
Fig. 5
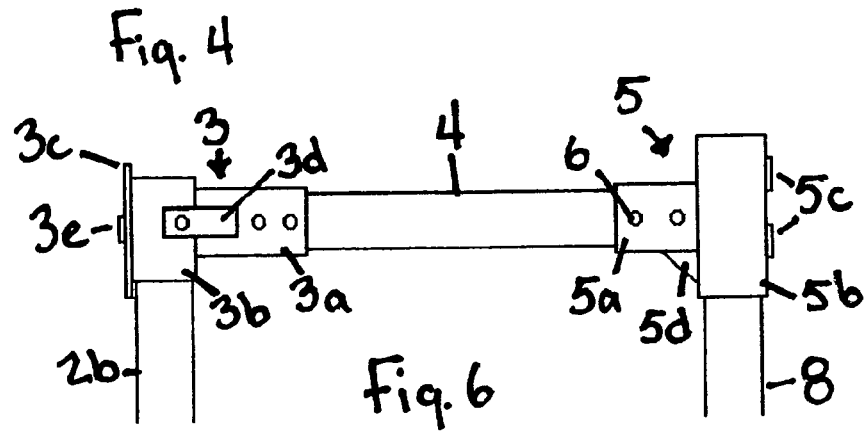
Fig. 6
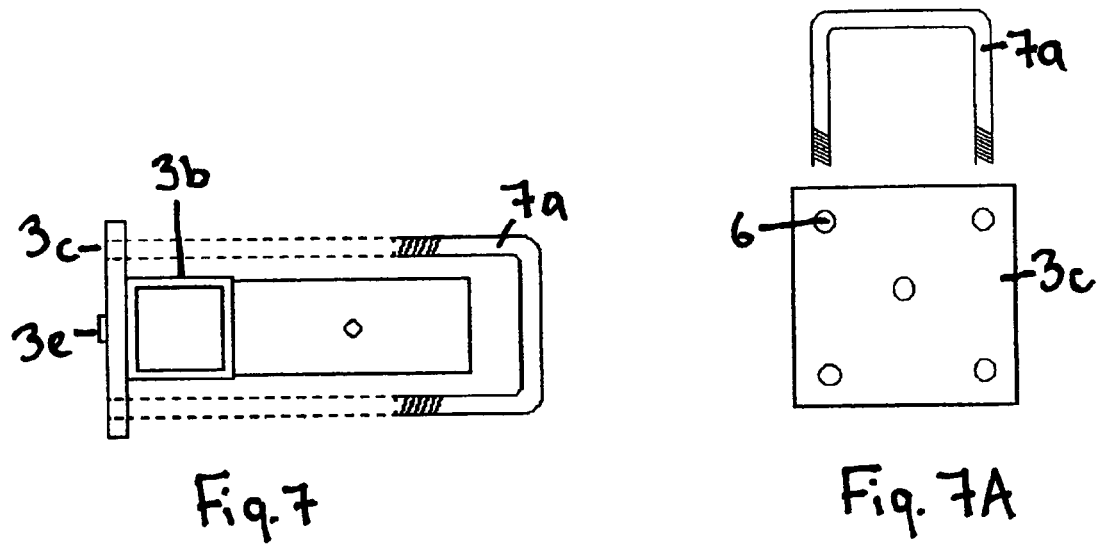
Fig. 7
Fig. 7A

TEMPORARY SINGLE ARM ADJUSTABLE GOOSE NECK HITCH SYSTEM

TECHNICAL FIELD OF THE INVENTION

This invention relates to the towing portion of a manufactured or home built tow behind trailer that attaches to the rearward towing device of an independent, self propelled vehicle such as, but not limited to a pickup truck. When using this invention the foresaid trailer is converted into a single arm goose neck trailer that can be connected to, and towed by a small utility truck, an All Terrain utility Vehicle, or a $5^{th}$ wheel dolly assembly.

BACKGROUND OF THE INVENTION

The traditionally manufactured tow behind trailer is produced with a rigid, fixed style hitch that is permanently integrated with the trailers frame. This production design has become the main stay for trailers that are used for transporting goods from one location to another, in industry, business, agriculture and the private sector. For the most part this tow behind trailer style performs well for their intended use or purpose. They however have a few short comings and limitations that need to be addressed, to give them more flexibility in their usefulness.

The first limitation associated with the traditional manufactured tow behind trailer hitch styles is that they can only be hooked or coupled to a matching towing hitch style equipped towing vehicle. The two primary coupling style devices are; a ball coupler and a pintle hook connecting device. This can restrict a trailers movement from one location to another because there is not a suitable towing vehicle available, due to the trailers size, weight, tow coupler style or the surface conditions that the trailer is to be traveling across.

A second limitation is that the traditionally manufactured tow behind trailer is fitted with either a straight tongue or an A frame style of hitch tongue. These hitches have a pre determined weight classification rating. The result of this limitation is that many times a trailer is over loaded for its hitch classification or for the hitch classification on the towing vehicle to which the trailer has been coupled to.

A third limitation for the traditionally manufactured tow behind trailer tongue hitch is that its single style hitch often requires a manufacturer to invest in a greater amount of raw materials, skilled labor and production equipment, in order to produce and meet the varied needs in the trailer market place.

These limitation of the traditional tow behind trailers, are some of the reasons for the development of the Temporary Single Arm Adjustable Goose Neck Hitch System.

SUMMARY OF THE INVENTION

The present invention is a new and improved hitch system when compared to previous inventions including the following prior art;

U.S. Pat. No. 6,109,640 issued to Allen et al, on Aug. 29, 2000 for WHEELED GOOSENECK ADAPTER FOR STANDARD HITCH TRAILER, an adapter for converting a tag-along or standard trailer to a gooseneck trailer.

U.S. Pat. No. 5,566,964 issued to Leonard on Oct. 22, 1996 for CONVERTIBLE TOWING SERVICE.

U.S. Pat. No. 5,324,061 issued to Lay on Jun. 28, 1994 for GOOSENECK HITCH APPARATUS. U.S. Pat. No. 4,832,358 issued to Bull on May 23, 1989 for TRAILER FIFTH WHEEL-GOOSENECK CONVERSION ADAPTER.

The temporary single arm adjustable goose neck hitch system has been developed for the purpose of converting a standard rigid hitch style of tow behind trailer into a temporary single arm goose neck/$5^{th}$ wheel trailer. This conversion system will allow for greater flexibility of a trailer when it is used for, on and off road tasks. This conversion is accomplished by attaching a quick exchange receiver coupler near the front of the hitch tongue, and to the underside of the said hitch tongue frame, as an optional accessory piece to a pre-manufactured trailer. The foresaid receiver coupler can also be integrated into the manufacturing process of a new trailer hitch tongue, as a standard feature. This receiver coupler accepts and locks in place the temporary single arm, adjustable goose neck hitch, or the fore said receiver coupler will also accept an adjustable, temporary straight arm tongue accessory hitch.

There are a number of advantages for the instillation of this invention on a traditional tow behind trailer. The quick exchange temporary single arm adjustable goose neck hitch conversion system will use the standard goose neck coupling devices such as a king pin style, or a ball coupler style coupling device, for connecting the fore said temporary goose neck hitch system to an independent tow vehicle such as but not limited to a small utility vehicle, a utility ATV, a $5^{th}$ wheel dolly hitch assembly or it can be attached to the standard rear hitch device of a tow vehicle such as a pickup truck.

A second advantage for this hitch conversion system is that it can be attached to a new or used trailer hitch tongue, converting a standard straight tongue style hitch, or a standard A frame style hitch tongue into a temporary single arm, adjustable goose neck style hitch system.

A third advantage for this hitch conversion system is that the standard trailer towing coupling connectors including the ball coupler connecter, and the pintle style coupling device can still be used with this conversion system, as an exchangeable accessory component pieces along with the temporary single arm, adjustable goose neck, and the adjustable, temporary straight tongue style of hitch.

A fourth advantage for the invention is hat it can also be used as an anti theft device. By removing the adjustable single arm temporary goose neck hitch or the straight tongue hitch from the trailer frame adjustable receiver coupler, a trailer is left without a towing device attached to the trailer frame hitch tongue.

A fifth advantage of the temporary single arm adjustable goose neck hitch system is that when a $5^{th}$ wheel dolly assembly is used in conjunction with this hitch system, a trailers function and maneuverability is greatly enhanced particularly on an off road job site, where a trailer can be moved with a smaller towing vehicle. In some situations a trailer may even be moved by hand pushing, when connecting a $5^{th}$ wheel dolly assembly to this hitch conversion system. A heavier load may be put on to the trailer when using the $5^{th}$ wheel dolly with out being in violation of the towing vehicles weight classification restrictions. This again gives more flexibility to a tow behind trailers capabilities.

There are also financial advantages to this hitch conversion system. First it can decrease the need of investing in multiple trailers because of the interchangeable hitch connector options that have already been mentioned. Another financial advantage can be realized in the greater choice of towing vehicles that can be used for different purposes and future applications, such as a trailer that is used for road travel, can now be coupled to an All Terrain Utility Vehicle that has been designed for off road use. The foresaid advantages are just a few examples, and they should not be viewed as limiting for other possible advantages.

BRIEF DESCRIPTION OF THE DRAWINGS

1. For a more complete understanding of the invention;

FIG. 4 Shows a side view of the temporary single connector arm inserted into a receiver coupler tube.

FIG. 5 shows a length of adjustable, exchangeable, horizontal cross beam

FIG. 6 shows a side view of an assembled single arm cross beam connector system

FIG. 7 Shows a top view of the rearward adjustable double receiver connector head FIG. 7A shows the flat plate portion of the rearward adjustable double receiver connector head, with a U bolt style of temporary fastener.

DETAILED DESCRIPTION OF THE INVENTION

Figure 1:
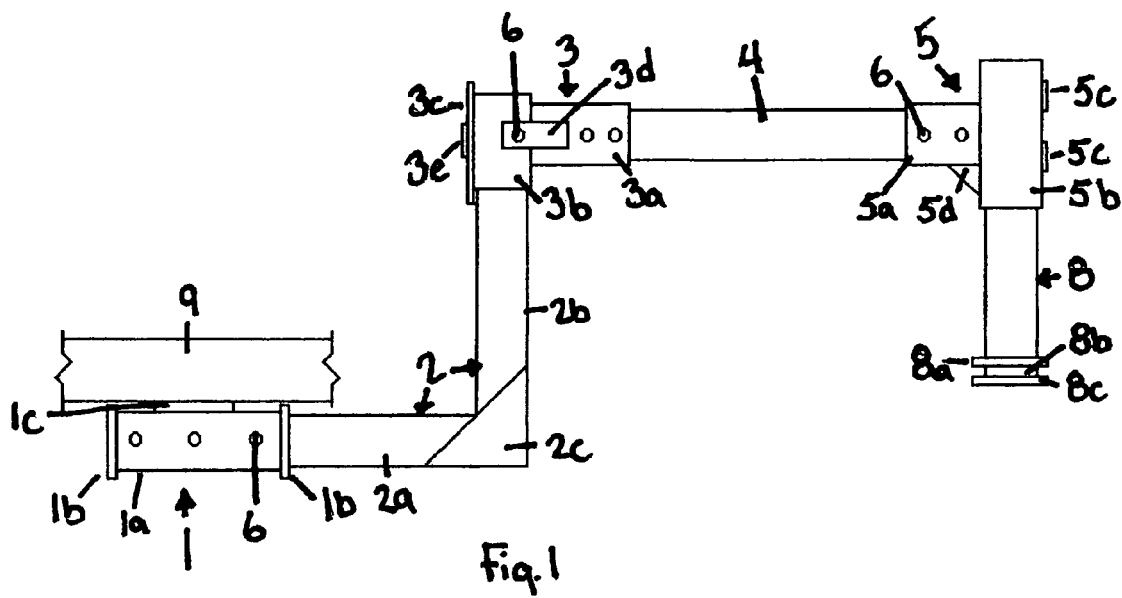
FIG. 1 Discloses a side view of an temporary single arm, adjustable goose neck hitch system, with the inset able, rearward connector tube end of the goose necks connector arm inserted into a receiver coupler that is attached to the under side of an existing trailer frame hitch tongue.
Figure 2:
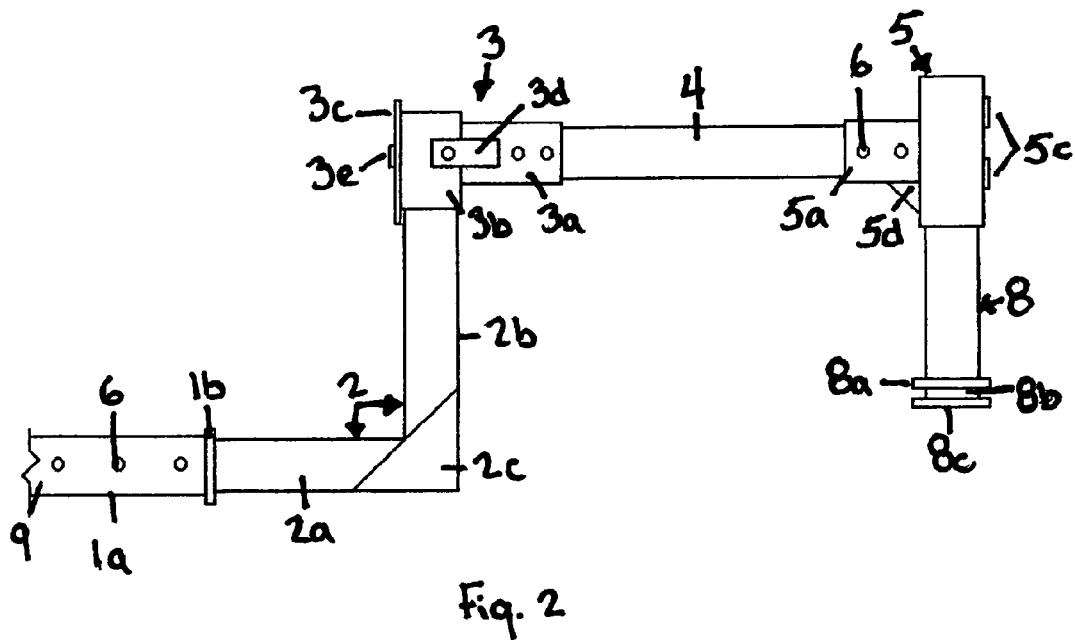
FIG. 2 Shows a side view of the temporary single arm, adjustable goose neck hitch systems insert able, rearward connector tube end inserted into a receive coupler that has been integrated into the trailer frame hitch tongue.

1. In accordance with the object of the invention set forth in the summary of the invention, The Temporary Single Arm Adjustable Goose Neck hitch system is shown in FIG. 1 as an attachment to the under side of the frame hitch tongue (9) in a forward position on a standard tow behind trailer (trailer not shown). This application of the fore said hitch system is an example of the invention being used as an optional after market accessory piece. FIG. 2 shows the fore said invention attached to a standard tow behind trailer frame hitch tongue (9) as an integrated standard feature of a pre manufactured tow behind trailer hitch tongue (trailer not shown). These two views of the invention represent just two hitch conversion applications for the invention, and they should not be used as limitations for other suitable applications for the use of this invention.

The Temporary Single Arm Adjustable Goose Neck hitch system is comprised of the following components; as shown in FIGS. 1 and 2. The fore said invention conversion application starts with a quick connect receiver coupler (1) FIGS. 1, 2 and 3 which has been brought forward from Canadian Pat. No 2,477,549 and U.S. patent application Ser. No. 12/460, 864, and having the same inventor. The quick connect receiver coupler (1) design starts with a length of hallow, square steel tubing (1a), with both of the ends left open, and function as receiver coupler ends for the purpose of inserting and connecting the temporary single connector arms, insert able connector tube (2a) FIGS. 1, 2 and 4 which will be discussed in more detail in FIG. 4. The fore said receiver coupler tube (1a) FIG. 3 has a plurality of pre drilled matching holes (6) along the right and left sides of the adjustable receiver coupler tube (1a) for inserting a temporary fastener (7) through the holes (6) in the receiver coupler as shown in FIG. 3B, and the pre drilled matching holes (6) in the insert able connector tubes (2a) FIG. 4 in order to secure the temporary single connector arm (2) in place. Both ends of the receiver coupler tube have been fitted with a single re enforcement band (1b) that gives added strength and support to the receiver coupler (1) FIGS. 3 and 3A when used in heavy down or side pressure loads. Each adjustable receiver coupler is also fitted with a steel flat connector plate(s) (1c) FIGS. 1, 2, 3 and 3A of sufficient strength and dimension, rigidly attached to the top side of the receiver coupler tube (1a) with a process such as welding for securing the said adjustable receiver coupler (1) to the trailer frames hitch tongue (9). This is done in such a way so that the receiver coupler (1) becomes an optional accessory component piece when attached to a pre manufactured trailer as shown in FIGS. 1 and 3C, or as a standard component piece on a newly manufactured trailer as shown in FIGS. 2 and 3D.

Figure 3:
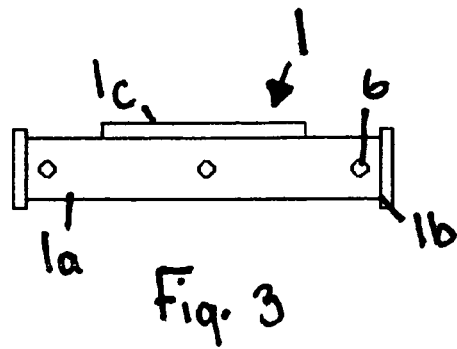
FIG. 3, shows a side view of a receiver coupler, 3A shows a top view of a receiver coupler with a connector flat plate
Figure 3A:
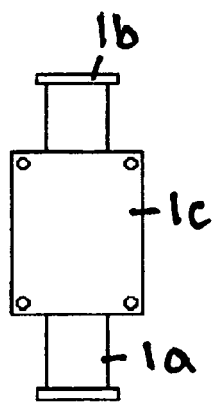
FIG. 3B is an end view of a receiver coupler with an inserted temporary fastener.
FIG. 3C shows a receiver coupler temporarily connected to the under side of a trailer hitch tongue using a temporary fastener.
FIG. 3D shows a top view of a receiver coupler integrated into an A frame style of hitch tongue.
Figure 3B:
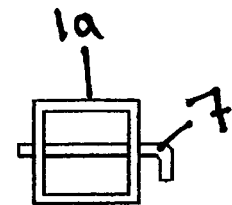

The fore said flat connector plate(s) (1c) FIGS. 3 and 3A design uses two different methods for attaching the fore said adjustable receiver coupler (1) to a pre manufactured tow behind trailer frame hitch tongue (9) FIGS. 1 and 2. The first method for attaching the receiver couplers flat connector plate (1c) that is attached to the top side of the adjustable receiver coupler tube (1a) is as a permanent attachment to the underside, and near the front of a trailers hitch tongue (9) by using a standard process such as welding FIG. 1.

Figure 3C:
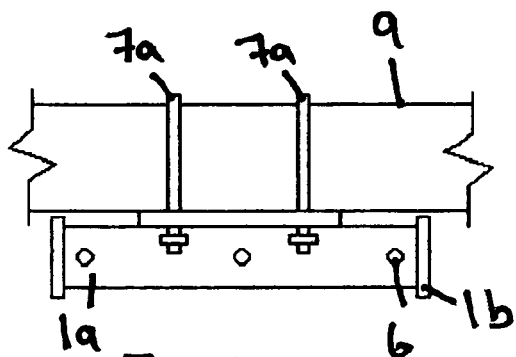
Figure 3D:
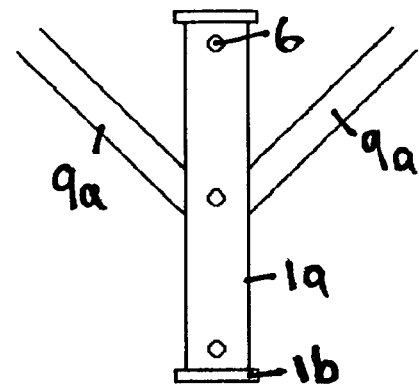

The second method used for attaching the fore said flat connector plate(s) 1c of the adjustable receiver coupler (1) to a tow behind trailer frame hitch tongue (9) uses temporary fastener(s), the fore said temporary fastener(s), include but not limited to a U bolt (7a) FIG. 3C are of sufficient length so as to extend over the tow behind trailer hitch tongues frame (9), and are inserted through the pre drilled hole(s) (6) in the flat connector plate (1c) that is attached to the receiver coupler (1) FIGS. 3, 3A and 3C allowing for a suitable connection of the receiver coupler (1) to the trailer hitch tongue frame (9).

There are two primary trailer hitch styles used when the adjustable receiver coupler (1) is integrated into the trailer frame as a part of a newly manufacturing trailer hitch. One is shown in FIG. 2, as a straight tongue, in this style the receiver coupler is incorporated as a part of the hitch tongue. The $2^{nd}$ hitch style is shown in FIG. 3D as an A frame style of hitch tongue connection. In this style the trailers hitch frame side member(s) (9a) can be fastened directly to the sides of the adjustable receiver coupler tube (1a) with or without the use of the connector flat plate(s) (1c). The adjustable receiver coupler (1) can be rotated ¼ of a turn so that the matching pre drilled holes (6) will be on the top and bottom sides so that the hitch frame side members (9a) will not be an obstruction when inserting or removing a temporary fastener(s) (7). This connection process makes it possible for the fore said adjustable receiver coupler (1) to be capable of accepting both the temporary single connector arm (2) portion of the adjustable goose neck hitch system and the adjustable, temporary straight arm connector tongue (10) FIG. 11 style hitch as a temporary interchangeable function of the invention.

The temporary, single arm adjustable goose neck hitch system as shown in FIGS. 1 and 2 make up further includes a temporary single connector arm (2) that is further comprised of an insert able connector tube (2a) FIG. 4 that slides into the adjustable receiver coupler (1) that is attached to a tow behind trailer frame hitch tongue (9) FIGS. 1 and 2, and is locked into place with the use of a temporary fastener (7) FIG. 3B. The forward end of the insert able connector tube (2a) is connected to a vertically positioned square steel tube (2b) as shown in FIGS. 1, 2 and 4. The vertical tube (2b) is connected to the forward end of the insert able connector tube (2a) by using a process such as welding. A metal gusset (2c) is welded to the right and left sides of the forward end of the horizontal tube (2a) and the lower end of the vertical tube (2b) to give added support and strength to the goose neck connector arm (2). This vertical tube (2b) is of a sufficient length, so as to allow the exchangeable, horizontal cross beam (4) FIGS. 1 and 2 to be an acceptable height, allowing for a proper clearance for the temporary single arm adjustable goose neck hitch system to function safely without obstructions when coupled to an independent towing vehicle. The fore sad vertical tube (2b) has matching pre drilled holes (6) near the upper end, and on the right and left sides for inserting a temporary fastener (7) for temporarily securing the rearward adjustable double receiver connector head (3) in place over the upper most end of the vertical tube (2b) portion of the single connector arm (2) FIGS. 4 and 6.

Another part of the temporary single arm adjustable goose neck hitch system is identified as a rearward adjustable double receiver connector head (3) in FIGS. 1, 2, 6 and 7. This adjustable double receiver connector head (3) make up includes a horizontal receiver connector tube (3a). This connector tube is a sufficient length of square steel tubing that accepts and secures in place the rearward end of the exchangeable, horizontal cross beam (4) FIGS. 1, 2, 5 and 6. The fore said horizontal receiver connector tube (3a) has matching pre drilled holes (6) on the right and left sides of the receiver tube, near the forward end of the receiver tube for the acceptance of a temporary fastener (7). The rearward end of the fore said horizontal receiver connector tube (3a) is welded to the forward side, and at a right angle to the vertically positioned receiver tube (3b) portion of the rearward adjustable double receiver connector head (3) FIGS. 1, 2, 6 and 7.

The fore said adjustable, vertical receiver connector tube (3b) is designed to fit over the vertical tube (2b) portion of the temporary single arm (2) so that it can be moved down or up when positioned over the fore said vertical tube (2b) as shown in FIGS. 1, 2 and 6. There are matching pre drilled holes (6) on the right and left sides of the vertical connector tube (3b) for inserting a temporary fastener (7). There is a flat steel support plate(s) (3d) positioned onto the right and left sides of the horizontal (3a) and vertical (3b) receiver connector tubes FIGS. 1, 2 and 6 with a process such as welding, so as to give added support to the rearward adjustable double receiver connector head (3). The fore said vertical receiver tube (3b) has a vertical flat plate (3c) rigidly secured to its rearward side with a process such as welding. A series of pre drilled holes are placed near the outer edges of the fore said flat plate (3c) FIG. 7A for the inserting of optional temporary fasteners (7a) for temporarily securing the rearward adjustable double receiver connector head in a temporary position over the fore said vertical connector tube (2b) FIGS. 1, 2, and 6. A set screw (3e) is inserted through the flat plate (3c) and the vertical receiver tube (3b) to secure the adjustable, vertical receiver connector tube (3b) portion of the rearward adjustable double receiver connector head (3) to the vertical arm (2b) portion of the fore said single arm (2) FIGS. 6 and 7.

A suitable Temporary fastener(s) such as, but not limited to a U bolt(s) (7a) can be used as an optional securing method for the fore said rearward adjustable double receiver connector head (3). The fore said temporary fastener(s) (7a) can be placed around the fore said vertical arm (2b). A fore said temporary fastener (7a) can be placed above the adjustable vertical receiver connector tube (3b) and one temporary fastener (7a) can be placed below the fore said adjustable vertical receiver connector tube (3b). The temporary fastener(s) such as a U bolt (7a) are of sufficient length so as to extend through the pre drilled holes (6) in the vertically positioned flat connector plate (3c) FIGS. 6, 7 and 7A to aid in the securing process when attaching the rearward adjustable double receiver connector head (3) to the vertical tube (2b) portion of the temporary single arm adjustable goose neck (2) FIG. 6.

FIGS. 1, 2, 5 and 6 show another part of the invention, identified as the adjustable, exchangeable horizontal cross beam (4). This beam is a section of square steel tubing of sufficient length to span the distance between the rearward adjustable double receiver connector head (3) that is connected to the vertical tube (2b) portion of the adjustable single connector arm (2), and the forward adjustable double receiver connector head (5) in such a way as to allow the vertical adjustable coupler support tube (8) FIGS. 1, 2 9 and 10 to be coupled to an independent towing vehicles coupling device (not shown) in a manner that allows the temporary single arm adjustable goose neck hitch system to function free of obstructions that would be related to the independent towing vehicle such as, but not limited to a small utility truck or an all terrain utility vehicle. The adjustable, exchangeable horizontal cross beam (4) has matching pre drilled holes (6) at various points on both the right and left side(s), and near the rearward and forward end(s) of the cross beam. These pre dilled holes are used for horizontal adjustments and securing the cross beam (4) in place within the rearward horizontal receiver connector tube (3a) and the forward horizontal receiver connector tube (5a) FIGS. 1, 2 and 6 by inserting a temporary fastener(s) (7) through the pre drilled matching holes (6) in both the horizontal receiver connector tube(s) (3a) and (5a) and the rearward and forward end(s) of the exchangeable horizontal cross beam (4). The fore said horizontal cross beam can be exchanged with other cross beams of longer or shorter lengths for added adjustments and versatility of the invention.

There are two adjustable double receiver connector heads FIGS. 1, 2 and 6 used for the connecting of the horizontal cross beam (4) within the temporary single arm adjustable goose neck hitch system. The rearward adjustable, double receiver connector head (3) attaches to the vertical arm (2b) FIGS. 1, 2 and 6, the second is the forward double receiver connector head (5) that attaches to the adjustable vertical coupler support tube (8) FIGS. 1, 2, 6 and 8.

The fore said forward double receiver connector head (5) FIGS. 1, 2 and 6 make up consists of a horizontally positioned square steel receiver tube (5a), with its rearward end being open for accepting the insert able connector tube end portion of the fore said exchangeable, horizontal cross beam (4), and further having a plurality of pre drilled holes (6) on the right and left sides of the horizontal receiver tube (5a) for accepting a temporary fastener, and further having the forward end of the fore said horizontal receive connector tube (5a) rigidly connected with a process such as welding, to the rearward side of a vertically positioned receiver connector tube (5b), having the upper and lower ends left open for accepting a length of vertically, adjustable coupler support tube (8), the fore said vertically positioned receiver connector tube (5b) having set screw(s) (5c) for temporarily securing the vertically adjustable coupler support tube (8) in a temporarily secured position, the fore said horizontal (5a) and vertical (5b) receiver connector tubes have a steel gusset(s) (5d) welded to their right and left sides so as to give a more rigid connection to the forward double receiver connector head (5).

Figure 8:
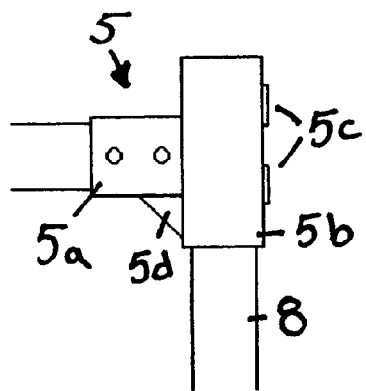
FIG. 8 shows a side view of the forward adjustable double receiver connector head

FIGS. 1, 2 and 6 shows the fore said adjustable vertical coupler support tube (8) inserted through an adjustable vertical receiver connector tube (5b), which is a part of the forward adjustable double receiver connector head (5) FIGS. 6 and 8. The fore said adjustable vertical coupler support tube (8) is a length of steel tubing of sufficient length so that the upper most end can be secured in place within the fore sad vertical receiver connector tube (5b), with the aid of a set screw(s) (5c), and further having its lower end connected to an independent towing vehicles coupling device (80 FIG. 10 (vehicle not shown). The adjustable characteristic of this adjustable vertical coupler support tube (8) is designed so that it can be adjusted up or down so that it can accommodate the varied heights of the independent towing vehicles trailer towing coupling device(s) (8f) FIGS. 1, 2 and 10 that are attached to an independent towing vehicle (vehicle not shown). There are pre drilled holes (6) on both sides and near the lower end of the fore said vertical coupler support tube (8) FIGS. 9 and 10. These matching pre drilled holes (6) are used for connecting the adjustable vertical coupler support tube (8) to the towing coupler adaptor (8b) FIGS. 9 and 10, with the use of temporary fasteners (7).

Figure 9:
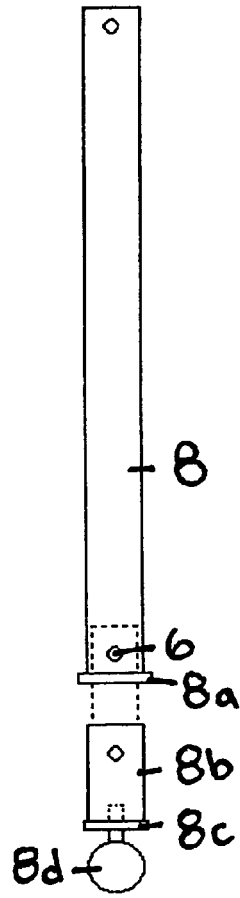
FIG. 9 shows the vertically adjustable coupler support tube with a pre manufactured king pin style coupling device.
Figure 10:
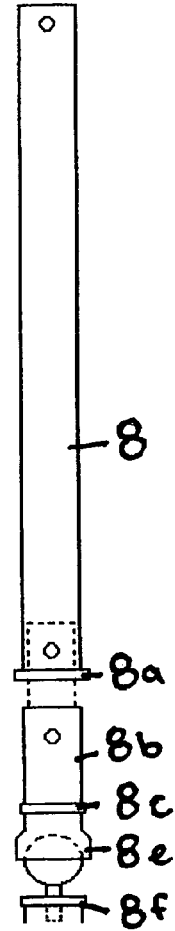
FIG. 10 shows the vertically adjustable coupler support tube with a pre manufactured ball coupler style of coupling device.

The fore said towing coupler adaptor FIGS. 9 and 10 make up starts with a length of steel tubing of sufficient size and length so that the adaptor tube (8b) can slide into the bottom end of the adjustable vertical coupler support tube (8) FIGS. 1, 2, 9 and 10 and be secured in place, with a temporary fastener (7) that is inserted through the pre drilled holes (6) that are near the lower end of the vertical coupler support tube (8) FIGS. 9 and 10 that are matched to the pre drilled holes (6) in the towing coupler adaptor tube (8b). The lower end of the towing coupler adaptor (8b) has been closed off by welding a piece of steel flat plating (8c) over the fore said lower end of the adaptor tube. A hole (6) has been pre drilled through the fore said flat plate (8c) of sufficient size to accept and secure in place the threaded shank of a pre manufactured trailer ball/king pin style coupling device (8d) FIG. 9. FIG. 10 shows a 5$^{th}$ wheel style pre manufactured ball coupler device (8e) attached to the lower end of the towing coupler adaptor (8c) with a process such as welding. Both styles of the fore said pre manufactured coupling devices (8d) and (8e) are used for connecting the fore said adjustable vertical coupler support tube (8) portion of the invention to an independent towing vehicles (not shown) towing coupling device such as, but not limited to component piece (8f).

Figure 11:
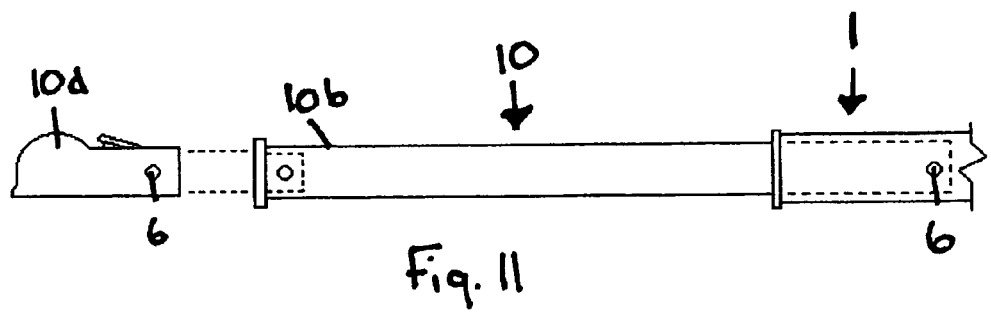
FIG. 11 shows a side view of an adjustable temporary straight tongue hitch device.

FIG. 11 show an adjustable temporary straight arm connector tongue (10), that has been designed to be a temporary exchangeable replacement accessory piece for the temporary single arm adjustable goose neck, as it is also capable of being inserted into the adjustable receiver coupler (1) FIG. 11 that is attached to a trailer frame hitch tongue (9) FIGS. 3C and 3D as an alternative, exchangeable part of the invention. The straight arm connector tongue (10) make up consists of a length of square steel tubing, and having its rearward most end functioning as an insert able connector tube (10a) that has pre drilled matching holes (6) that match the pre drilled holes (6) in the fore said adjustable receiver coupler (1) FIGS. 3 and 11. The insert able connector tube (10a) slides into the receiver coupler (1) and is secured in place with the use of a temporary fastener(s) (7) FIG. 3B. The forward tube end (10b) of the fore said adjustable temporary straight arm connector tongue, functions an accessory connecting receiver coupler end, and further having a re enforcement band (10c). The accessory connector receiver end (10b) is suitable for accepting an accessory coupling device such as, but not limited to a pre manufactured ball coupler (10d). The pre manufactured coupling device (10d) is attached to the straight arm connector tongue with the use of temporary fasteners (7) in the matching pre drilled holes (6) that are in the right and left side(s) of and near the forward end of the accessory connecting receiver tube end (10b) portion of the adjustable, temporary straight arm connecting tongue (10) FIG. 11

Temporary Single Arm Adjustable Goose Neck Hitch System Numerical Components List 1. Adjustable Receiver Coupler
1a. Receiver tube
1b. Re enforcement band
1c. Flat connector plate
2., Temporary, single connector arm
2a. Horizontal Insert able connector tube
2b. Vertical insert able connector tube
2c. Weld on Gusset
3. A rearward adjustable double receiver connector head
3a. Adjustable horizontal Receiver connector tube
3b. Adjustable vertical receiver connector tube
3c. Flat connector plate
3d. Weld on support plate
3e. Set screw
4. Adjustable, Exchangeable, horizontal cross beam
5. Forward adjustable double receiver connector head
5a. adjustable horizontal receiver connector tube
5b. Adjustable vertical receiver connector tube
5c. Set screw(s)
5d. Weld on gusset
6. Pre drilled hole
7. Temporary fastener
7a. U bolt temporary fastener
8. Adjustable vertical coupler support tube
8a. Re enforcement band
8b. Towing coupler adaptor tube
8c. Adaptor tube end plate
8d. Pre manufactured hitch ball style coupler device (king pin)
8e. Pre manufactured 5$^{th}$ wheel ball coupler device
8f Pre manufactured vehicle mounted 5$^{th}$ wheel style coupling device 9. Trailer frame hitch tongue
9a. Hitch frame side member(s)
10. Temporary straight arm hitch tongue
10a. Rearward insert able connector tube end
10b. Forward receiver coupler connector tube end
10c. Re enforcement band
10d. Pre manufactured coupling device

I claim:

1. A detachable single arm adjustable goose neck hitch system having a first and second end, wherein the first end most rearward end is detachably attached to a trailer frame hitch tongue that has been equipped with a receiver coupler, and the second end is detachably attached to a towing coupling device of an independent towing vehicle, the goose neck hitch system is comprised of:
    a) a receiver coupler (1) which is comprised of a square steel tubing having both ends open for receiving a single connector arm tube (2a), and having a plurality of matching holes on its right and left sides for the inserting of temporary fasteners, and further having connector flat plates (1 c) rigidly connected to the upper and lower sides of the square tubing (1a) by means of welding, said flat plates having a plurality of matching holes near their outer edges for inserting temporary fasteners for securing the flat connector plates to a trailer hitch tongue wherein both ends of the receiver coupler tube (1a) further having re enforcement bands welded there to;

b) a temporary, single connector arm (2) is comprised of a first horizontally positioned square steel tubing (2a) with two ends, the first end functions as an insertable connector tube said tubing having matching pre drilled holes on all four sides and in close proximity to the rearward end, for accepting temporary fasteners for detachably attaching said rearward end into the receiver coupler (1) said single connector arm (2) further having a second vertically positioned square steel tubing (2b) said vertically positioned tube having its lower end connected to the forward end of said horizontally positioned tube (2a) at a right angle and having a flat steel gusset (2c) connected to the right and left side of the horizontal (2a) and vertical (2b) connector tubes at their joining ends by means of welding, said vertically positioned tube (2b) having an upper end that functions as an insertable connector tube for accepting a rearward, adjustable double receiver connector head (3);

c) the rearward adjustable double receiver connector head (3) comprising a horizontally positioned square steel receiver tube (3a) having a first end open, and further having on both right and left sides matching pre drilled holes for the acceptance of temporary fasteners, and having a second end secured to a second vertically positioned square steel receiver tube (3b) at a right angle by means of welding a vertically positioned square steel receiver tube (3b) having both upper and lower ends open, said receiver tube (3b) further having a flat connector plate (3c) secured to the rearward side of the said receiver tube (3b) by means of welding;

d) a forward adjustable double receiver connector head (5) consisting of a horizontally positioned square steel tubing (5a), having one end open and having a plurality of pre drilled matching holes on both its right and left sides for the accepting of temporary fasteners, and another end securely connected to the vertically positioned steel tubing (5b) at a right angle by means of welding, said vertically positioned steel tubing (5b) having both ends open for receiving the adjustable vertical coupler support tube (8);

e) an adjustable, exchangeable, horizontal cross beam (4), square steel tubing having both rearward and forward ends functioning as insertable connector tubes, and having pre drilled matching holes on the fight and left sides in close proximity of both ends of the tubing for accepting temporary fasteners, so that the rearward end of the said horizontal cross beam is detachably attached to the horizontally positioned receiver connector tube portion (3a) of the rearward double receiver connector head (3), and the forward end of said cross beam (4) is detachably attached to the horizontally positioned connector tube (5a) of the forward double receiver connector head (5);

f) a vertically, adjustable coupler support tube (8) comprising a steel tubing having two ends, wherein the first end having predrilled holes (6) near its proximate end, said first end is adapted for connecting to a towing coupler adaptor by means of fasteners through the predrilled holes, said first end further having a re enforcement band welded to its outer edge, and the second end of said coupler support tube (8) being inserted through a lower end of a vertically positioned tube (5b) of the forward connector head (5), secured in a vertical position with temporary fasteners (5c);

g) a towing coupler adaptor comprised of a steel tubing 8b) and having matching pre drilled holes on the right and left sides for inserting of fasteners (7), and further having an end plate (8c) that is securely connected to the coupler adaptor by means of welding, said coupler adaptor having a pre manufactured coupling device securely connected to said end plate (8c).

2. The detachable goose neck hitch system of claim 1, wherein said vertically positioned square steel receiver tube of said rearward double receiver connector head (3) having open ends for allowing said connector head to slide up and down and re-secure to said vertical, insertable connector tube (2b), and further having a vertically positioned flat plate (3c) having a plurality of matching pre drilled holes in close proximity to the outer edges for accepting temporary fasteners for securing the adjustable double receiver connector head (3) in a position over the said vertically positioned insertable connector tube (2b), said flat plate further having a set screw (3e) near a center of said flat plate to allow for securing temporary placement of the said receiver connector head (3).

3. The detachable goose neck hitch system of claim 1, wherein said vertically positioned steel receiver tube (5b) of said forward double receiver connector head (5) having open ends for allowing the adjustable, vertically positioned coupler support tube (8) to slide up and down and re-secure by a temporary fastener to said vertically positioned receiver connector tube (5b)).

4. The detachable goose neck hitch system of claim 1 further comprising a detachably attached straight arm hitch tongue (10) consisting of a length of square steel tubing, having a first and second ends, wherein said first forward end functions as a horizontally positioned receiver coupler tube for accepting detachably attached pre manufactured towing devices, and having a re enforcement band securely connected to the outer edge by means of welding, said hitch tongue (10) further having a second rearward end functions as an insert able connector tube that detachably attaches within the receiver coupler (1) of a trailer frame hitch tongue (9), said straight arm hitch tongue (10) further having pre drilled holes on the right and left sides in close proximity of both ends of the tubing for accepting temporary fastener.

* * * * *